May 28, 1963 H. W. GOARD 3,091,335
APPARATUS AND METHOD FOR CONTINUOUS SEPARATION
OF SOLIDS FROM LIQUIDS
Filed March 30, 1961
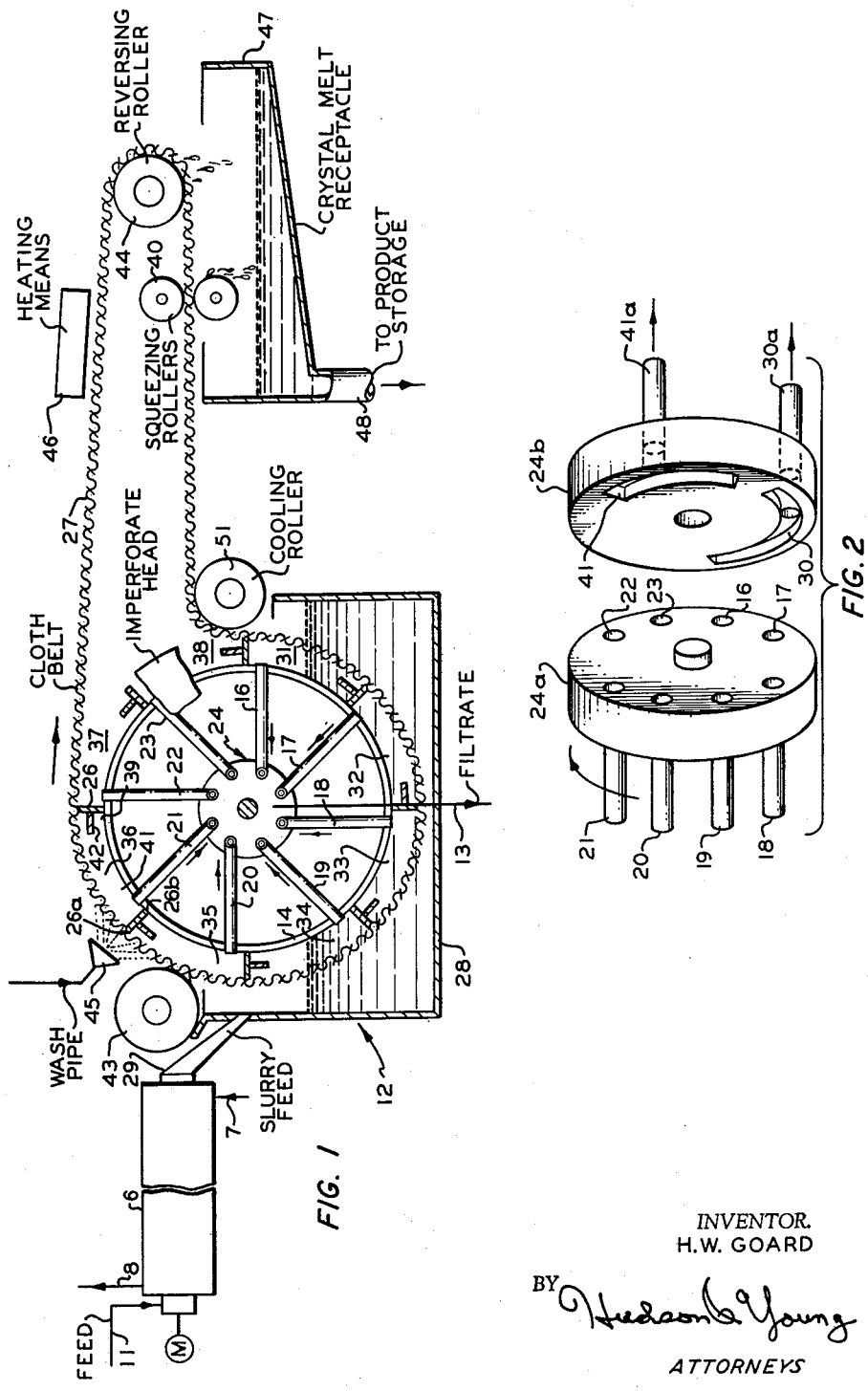
INVENTOR.
H.W. GOARD
BY Hudson & Young
ATTORNEYS United States Patent Office 3,091,335
Patented May 28, 1963

3,091,335
APPARATUS AND METHOD FOR CONTINUOUS
SEPARATION OF SOLIDS FROM LIQUIDS
Howard W. Goard, Bartlesville, Okla., assignor to Phillips
Petroleum Company, a corporation of Delaware
Filed Mar. 30, 1961, Ser. No. 99,595
1 Claim. (Cl. 210—71)

This invention relates to the separation of solids from liquids. In one aspect it relates to improving the separation of finely divided solids from a mother liquor employing a conventional filter medium.

There has been developed an improved system of crystal separation from mother liquor which comprises chilling a liquid containing the material to be separated therefrom so as to produce crystals of at least that material. The resulting slurry of crystals and mother liquor is then passed to a drum filtration zone where the liquor is drawn through a filtration medium, and the crystals are deposited on the filter medium, and thereby separated from the mother liquor. The crystals are conventionally scraped from the filter medium and passed to further purification.

In order to separate solids from liquids by filtration, it is the practice to use a filter medium with pore openings generally smaller than the average particle size of the solid to be removed from the liquid. It is apparent that any given medium will plug in time with continuous operation. With some larger-sized solids, plugging takes a relatively longer time before it becomes necessary to shut down and clean the filter medium. With smaller size solids, fragile crystals, slimy materials, and the like, plugging will occur much more rapidly, requiring frequent shutdown for cleaning so that throughput becomes low, and operation falls to uneconomic levels.

A compromise is generally reached with these opposing factors for a particular separation. For example, a medium with bigger pore size is chosen to permit less frequent plugging, but at the expense of more solids being drawn through the medium and lost with the filtrate.

The separation of finely divided solids, and solids that become finely divided upon being drawn onto a filter medium, requires a filter medium with extremely small perforations or interstices, so that the solids will not be drawn through the filter medium with the mother liquor. Subsequent scraping of solids from the medium is hindered because of the fine nature of the crystal deposit. Consequently, standard filter media rapidly plug with these fine solids, and filtration efficiency quickly drops, causing the rotary filter to be frequently stopped while the filter medium is laboriously cleaned.

It is an object to provide a continuously self-cleaning rotary filter.

It is a further object to permit the use of a filter medium of relatively small pore size for maximum solids separation from the mother liquor without the chronic plugging associated with media having fine pore sizes.

It is another object of this invention to provide an apparatus for the continuous separation of finely divided solids from their liquid solvents. It is another object to provide a method for continuously separating finely divided solids from a mother liquor.

It is still another object to adapt a conventional rotary filter to efficiently separate finely divided solids from a mother liquor with a minimum of shutdowns for cleaning of the filter medium.

Another object is to recover finely-divided solids from a liquid with negligible loss of said solids through filter medium.

Other objects and advantages of this invention will become apparent to those skilled in the art without departing from the scope and spirit of this invention and it should be understood that the latter is not necessarily limited to the aforementioned discussion and accompanying drawing, wherein:

FIGURE 1 is a sectional elevation of a form of the improved, continuous, rotary-drum filter; and FIGURE 2 is a detail view of the slide valve arrangement of the filter.

Broadly speaking, my invention provides means for separating solids from the filter medium to overcome residual plugging of the pores thereof, by melting the solids while still retained on the filter medium, and squeeze separating melt therefrom before returning the filter medium to the slurry for further solids pickup. I have provided heating means disposed proximate to the filter medium and between the rotary drum of the filter and a roller for reversing the direction of the filter medium belt. This heating step melts the deposited finely divided solids, which belt then passes around the reversing roller, through squeezing roller means disposed about said filter medium, which means separate the melted solids from the medium and drop them to a collection zone. Finally, the substantially solids-free filter medium belt may be recooled, as desired, before re-entering the slurry feed, by passing through cooling means adapted to cool it down to a temperature where it will absorb additional finely divided solids.

My invention permits the use of a filter medium with significantly smaller pore openings than possible in the prior art practice of avoiding excessive plugging. I achieve this by my continuous self-cleaning of the medium with each cycle, while substantially improving solids collection from the mother liquor.

Referring now to the drawing, a slurry of liquid and solids, for example, crystals of a mixture of isomeric, eight carbon atom hydrocarbons and mother liquor is formed in scraped chiller 6 and is supplied to the rotary filter, generally designated 12. Chiller 6 is refrigerated by a refrigerant supplied through conduit 7 and withdrawn through conduit 8. A liquid feed, which may or may not contain solids enters the system via line 11. Barren mother liquor (filtrate) is removed through conduit 13. Filter drum 14 of rotary filter 12 has conduit lines 16, 17, 18, 19, 20, 21, 22 and 23 communicating with the exterior surface of the drum and a rotary valve, generally designated 24. Partition members, such as 26, are positioned around and secured to the outside surface of drum 14 so as to provide support for a filter medium, such as woven cloth 27, and further to divide the chamber between drum 14 and cloth 27 into segments. The imperforate heads of the filter drum form two sides of a chamber between the drum and the filter cloth. Conduits 16—23 connect the trailing edge of each segment with slide valve 24. Drum 14 is partially immersed within filter base 28 containing the slurry of solids and liquid to be separated. The liquid-solids slurry is supplied to receptacle 28 by conduit 29.

Each partition member 26 has one edge, 26a, contacting cloth 27, and the other edge 26b attached to drum 14. The partition members 26 form the segments indicated as 31, 32, 33, 34, 35, 36, 37 and 38. Each segment has a leading edge or portion indicated at 39, and a trailing edge or portion indicated at 41. A baffle 42 is secured to the trailing side of each partition member 26, with respect to the direction of rotation of drum 14, so as to project into the trailing portion 41 of the filter segments 31—38. The filter segments are all identical in structure, but are numbered differently to facilitate identification.

As the drum rotates, vacuum is applied to that portion of the drum and filter medium which is below the surface of the slurry, indicated in the drawing, by the segments connected to a slide valve by conduits 16, 17 and 18. Thus, segments 31, 32 and 33 become filled or substantially filled with liquid, and solids are collected upon the outer surface of cloth 27. These segments are connected via said conduits to a port 30 within rotary valve 24, which port communicates with a conduit 30a, within said valve for suction, as shown in FIGURE 2.

As drum 14 rotates clockwise out of the slurry, finely divided solids remain deposited on the filter medium 27, then pass under compression roller 43 if desired, whereby much of the occluded mother liquor is squeezed therefrom and drops back into vessel 28. A perforated wash pipe 45 may preferably be disposed adjacent the drum to spray wash liquid onto segments 35 to help further remove occluded mother liquor from the cake. In this manner, the purity of the filter cake product will not be impaired by excessive, occluded mother liquor.

Segments 31, 32 and 33 eventually rotate so as to occupy a position presently indicated by segments 34, 35 and 36. Thus, conduits 16, 17 and 18 are connected to rotary valve 24 in the position presently indicated by conduits 19, 20 and 21. Vacuum continues to be applied to segments 31, 32 and 33, presently indicated by 34, 35 and 36, so as to draw wash liquid and/or a drying medium, such as air, through the filter cake of solids collected on cloth 27, and to withdraw liquid from segments 31, 32 and 33. These segments are now connected by conduits 16, 17 and 18 to port 41 of rotary valve 24, which is adjacent to a conduit 41a for suction, as shown in FIGURE 2.

When a segment of the filter is in the position indicated by 37 or 38, it is no longer enclosed by cloth 27. Thus these two segments must be connected by their respective conduits such as 22 and 23 to a blank portion of rotary valve 24b. In this manner, drying medium will not be sucked through these open segments, thus avoiding destroying the vacuum being pulled within the filter through the remaining closed segments. The absence of a pressure gas inlet for blowing the cake from the filter medium is, of course, obviated by the teaching of this invention, since it provides for separating the finely divided solids from the filter medium by novel means.

Filter medium 27 passes substantially tangentially from the top of drum 14 some distance to a reversing roller 44 which reverses the direction of the woven cloth 27 back toward drum 14. Intermediate the top side of drum 14 and reversing roller 44 is disposed a heating means 46 which is proximate to woven cloth 27. Heating means 46 may be direct, such as gas-fired burners, or indirect, such as pipes, through which steam or hot oil is passed.

Optionally, the deposited solids may be melted by spraying hot vapors, such as live steam onto said solids. The solids may also be melted by removing a portion of the crystal melt from receptacle 47, passing it through a heat exchanger (not shown) so as to completely vaporize the melt; and directing said hot vapors onto said solids deposited on belt 27. This heating means is adapted to supply sufficient heat to the finely divided solids on the filter medium so as to completely melt the same, without damaging the cloth itself. Also, the invention may be useful with a Dorr-Oliver rotary horizontal filter, where a tapered roller can serve as the squeezing roller means.

As the medium passes under reversing roller 44, the liquefied solids begin to drop off into a crystal melt receptacle 47, from the bottom of which they are conducted via conduit 48 to product tank, or to further purification means (both not shown). While still disposed above receptacle 47, the medium passes through pairs of squeezing rollers 40, only one shown for convenience, which compress the woven cloth and squeeze substantially all of the crystal melt therefrom, the melt dropping from the bottom of rollers 40 into receptacle 47. The substantially solids and melt-free filter medium next passes over one or more cooling means 51, such as a water-cooled roller, which means are adapted to cool the filter medium down to a temperature approximately equal to that of the slurry in filter tank 28. Alternatively, the medium may be cooled by first running it through a separate bath (not shown) of cold filtrate drawn from conduit 13.

The filter medium then recontacts partition members 26 passing down through the slurry to continue the solids separation process, as just described.

A typical multiple compartment, rotary drum filter has been described in connection with this invention. However, the invention is equally suited to situations employing a single-compartment, rotary drum filter, such as manufactured by Bird-Young Co.

A variety of filter media may be employed with this invention, and the continuous cleaning thereof, effected by the claimed method. A list of such typical media follows in the table:

TABLE

*Filter Media and Manufacturer*

| | Average Pore Radius, μ | Radius of Maximum Pore, μ | Interfiber Pore Radius, Modal value, μ |
|---|---|---|---|
| No. 8 Cotton Duck, Turner-Halsey Co. | 0.9 | 12.4 | 2.9 |
| National 33 (175-TW) Cotton, National Filter Media Co. | 4.1 | 44 | 5.3 |
| Wellington Sears SN23, Wellington Sears Company | 5.2 | 91 | 4.0 |
| Feon 420 Orlon, American Machine & Metals, Inc. | 8.0 | 83 | 3.9 |
| Stehli and Company: | | | |
| Stehli 5044 Nylon | 5.5 | 29 | 3.0 |
| Stehli 5071—U Orlon | 14 | 71 | 3.8 |
| Stehli 5071—F Orlon | 5.4 | 39 | 2.2 |
| Wellington Sears SN7 Nylon, Wellington Sears Company | 10.5 | 128 | 5.0 |
| Albany 220 Wool felt, Albany Felt Company | 3.2 | 21 | 16.5 |

Exemplary of the types of filter media and solids which can be separated therewith, is the Albany 220 wool felt for filtering paraxylene crystals having a particle size ranging from 5–20 microns ($\mu$) and having an average size of 10$\mu$. Such a felt is able to separate paraxylene from a cooled mixed xylene stream containing approximately 10 weight percent paraxylene. By employing the self-cleaning method of this invention in connection with a rotary drum filter, frequent periodic plugging of the wool felt and shutdown for conventional medium cleaning techniques is obviated, and substantially complete recovery of the crystals is obtained.

Various modifications and alterations of this invention will become apparent to those skilled in the art without departing from the scope and spirit of this invention and it should be understood that the latter is not necessarily limited to the aforementioned discussion.

I claim:

An apparatus for continuously separating solids from a liquids-solids slurry comprising: a rotary filter having imperforate heads spaced apart by an endless perforate filter medium spaced externally from an impervious drum; spaced partition members connecting said drum and said filter medium so as to form separate filter segments; drain conduits connected to the edge of said filter segments; means for alternately supplying fluid to and withdrawing fluid from said drain conduits; means to rotate said drum; a reversing roller located external of said drum and positioned so that said filter medium passes from said drum and over said roller; a receptacle disposed below said reversing roller; heating means positioned proximate to said filter medium and between said drum and said reversing roller for supplying heat sufficient only to fuse finely divided solids previously deposited on said filter medium as it is rotated through the slurry feed in said rotary filter; a cooling means located proximate to the drum recontact point of said filter medium, said cooling means adapted to cool said heated filter medium; and squeezing roller means disposed about said filter medium between said reversing roller and said cooling means; said reversing roller adapted to cause fused finely divided solids to drop from said medium into said receptacle; said squeezing roller means adapted to separate the remaining melted solids from said filter medium and pass the former into said receptacle.

References Cited in the file of this patent

UNITED STATES PATENTS

| | | |
|---|---|---|
| 2,713,022 | Dole et al. | July 12, 1955 |
| 2,881,127 | Hetzel | Apr. 7, 1959 |
| 2,889,931 | Buttolph | June 9, 1959 |